C. G. DEMING.
VEHICLE WHEEL TIRE.
APPLICATION FILED DEC. 22, 1908.
983,880.
Patented Feb. 14, 1911.
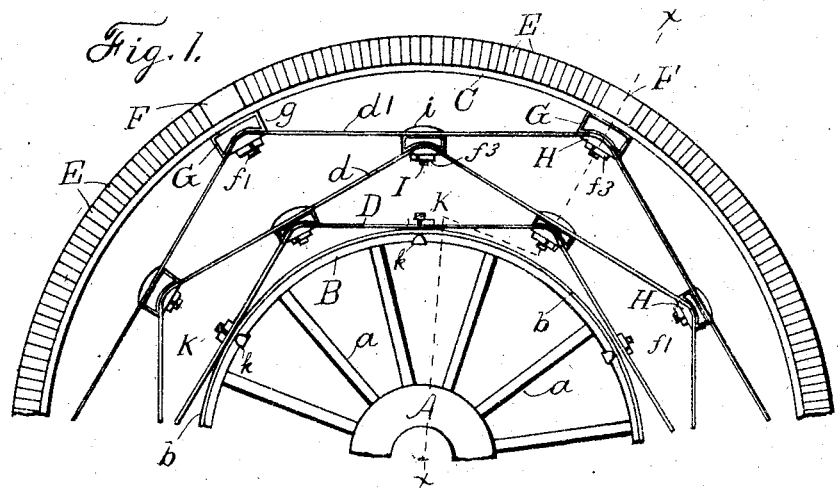
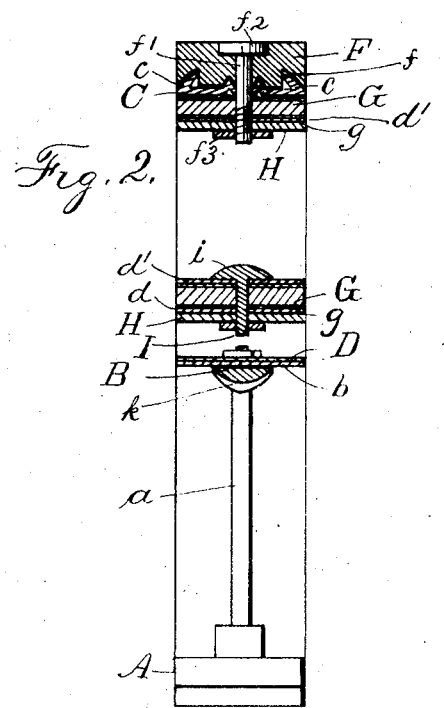
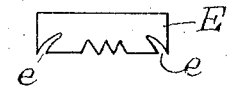
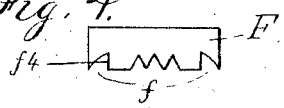
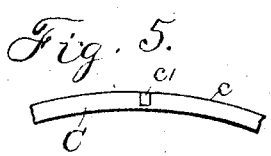
Witnesses
Inventor
Charles G. Deming.
By Chas. D. Swett.
Attorney

UNITED STATES PATENT OFFICE.

CHARLES GAYLORD DEMING, OF SYRACUSE, NEW YORK.

VEHICLE-WHEEL TIRE.

983,880.

Specification of Letters Patent.   Patented Feb. 14, 1911.

Application filed December 22, 1908.   Serial No. 468,760.

*To all whom it may concern:*

Be it known that I, CHARLES G. DEMING, a citizen of the United States, residing at Syracuse, in the county of Onondaga and State of New York, have invented certain new and useful Improvements in Vehicle-Wheel Tires, of which the following is a specification.

My invention relates to tires for vehicle wheels of all kinds and is especially adapted for use on automobiles and similar vehicles. It is resilient, non-puncturable, strong and durable. It is also simple in construction and of low cost.

The accompanying drawing illustrates a preferred form of the invention, in which—

Figure 1 is a side elevation of approximately, the upper one half of a wheel fitted with my tire. Fig. 2 is a cross-section, enlarged, on line $x$—$x$ of Fig. 1, the rim bolt and hub not being in section. Fig. 3 is a side view of a tread plate. Fig. 4 is a side elevation of a metal block; and Fig. 5 is a side view of a portion of the rim. Figs. 3, 4 and 5, are drawn on the same scale as Fig. 2.

The letter A designates the hub of a vehicle wheel and $a$, $a$, the spokes thereof. These parts are made of any preferred materials.

B is the felly of the wheel preferably made of wood and having a metal band $b$, on its outer face. It is secured to the spokes in any preferred way.

C is the outer rim of the wheel or tire, and D, $d$, $d^1$ denote respectively, the inner, the mediate and the outer stays, arranged in angular form, between the felly B and the rim C, and tightly secured to those parts. The rim C has the inclined flanges $c$, $c$.

E, E, are short, thin cross plates, standing edgewise on the rim C, and having recesses $e$, $e$, engaged by the flanges $c$, $c$, on the rim C. These plates E are inserted in the rim through an opening $c^1$ in a flange $c$ of the rim, and then moved along into operative position. At each hole $c^1$ is a steel block F, of the same length and breadth as the plates E but several times thicker, and also having recesses $f$, to engage the flanges $c$ on the rim, but with the inner sides $f^4$ of said recesses made vertical in order that said block may be lifted up directly from the rim. Each steel block has a bolt hole and a bolt $f^1$ therein. The head of the bolt $f^2$ is countersunk in the outer face of the block F, and its body, threaded at its farther end, passes through the rim C, a wooden block G, the stay $d^1$, and a clamp H, and is provided with a nut $f^3$, by which all these parts are tightly drawn together. The rim C is preferably corrugated, as are also the blocks F and tread plates E, so they may engage the corrugations on the rim, to insure a stable connection between these parts.

The recesses $e$, $e$, in plates E, and the recesses $f$, $f$, in blocks F, are cut entirely through the bottoms of those parts, leaving the lower corners of the plates and blocks intact. The lower outer corners therefore, of these parts, extend outwardly over the flanges $c$, $c$, and downwardly to the level of the bottom of the rim C, on which these parts rest. Thus the lower edges of these plates and blocks are in line, and the blocks entirely cover the openings $c^1$, in the rim. By this construction, the bolting on of side plates or sections of rim, to cover the rim openings is avoided, both in trouble and cost.

The wooden blocks G may be partially incased in a thin metal covering $g$, to prevent the splitting of the blocks. These blocks G, are intended to distribute somewhat the strain upon the angles of the stays, and so prevent the breaking of the stays. The clamps H, co-act with the wooden blocks to support the stays and to relieve the strain at the stay angles, being of a triangular shape and having the angle in contact with the stay, rounded off. Each stay is an endless steel band and approximately one eighth of an inch thick. The angles of stay $d^1$ being secured as described, each angle of the stay $d$ is secured to stay $d^1$ midway between its angles, by means of a bolt I, having a broad head $i$, bearing upon the outer surface of stay $d^1$, the shaft of the bolt passing through stay $d^1$, a wooden block G, the stay $d$, and the clamp H, these parts being bound together by the nut $f^3$, as above described. The angles of stay D are secured to stay $d$ in the same manner that stay $d$ is secured to $d^1$. The stay D is secured to the felly by an anchor shaped bolt K whose arms $k$ embrace the felly. The bolt is threaded and provided with a nut to bind the stay securely in place. These stays when set in position are flexible to a degree, as permitted by their connections and afford a resilient support to the weight that comes upon them through the hub A. The tread plates are very durable and yield slightly in connection with the rim to the pressure upon them.

Any preferred number of stays may be used and they may be formed with more or fewer angles than are shown in the drawing. I do not confine myself to the precise means shown for binding the parts together, but find the bolts quite effective for the purpose.

What I claim and desire to secure, is—

In a wheel having a rim with inclined flanges thereon and provided with narrow lateral openings, a tread composed chiefly of thin plates having upwardly inclined recesses in their bottoms to engage said flanges and adapted to be inserted in said rim through said openings, tread blocks having upwardly inclined recesses in their bottoms only, the inner sides of said recesses being vertical said blocks being adapted to be fitted directly into said rim and to cover said openings therein, said rim having corrugations engaged by corrugations on said plates and blocks and radial bolts whose heads are countersunk in the outer faces of said blocks and which extend directly through said blocks and said rim to hold said blocks in position, as specified.

In testimony whereof I affix my signature in presence of two witnesses.

CHARLES GAYLORD DEMING.

Witnesses:
 FANNY L. PELTIE,
 JOHN W. SADLER.